US007877251B2

(12) United States Patent
Kumaran et al.

(10) Patent No.: US 7,877,251 B2
(45) Date of Patent: Jan. 25, 2011

(54) DOCUMENT TRANSLATION SYSTEM

(75) Inventors: Arumugam Kumaran, Bangalore (IN); Sean Olin Blagsvedt, Bangalore (IN); Joseph Joy, Bangalore (IN); Lucretia H. Vanderwende, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 11/745,291

(22) Filed: May 7, 2007

(65) Prior Publication Data

US 2008/0281578 A1    Nov. 13, 2008

(51) Int. Cl.
*G06F 17/28*    (2006.01)
*G10L 21/00*    (2006.01)
(52) U.S. Cl. .................... 704/2; 704/270.1; 704/277
(58) Field of Classification Search .................... None
See application file for complete search history.

(56) References Cited

U.S. PATENT DOCUMENTS

| | | | |
|---|---|---|---|
| 5,349,368 A * | 9/1994 | Takeda et al. ............... 345/684 |
| 5,963,940 A | 10/1999 | Liddy et al. |
| 6,006,221 A | 12/1999 | Liddy et al. |
| 6,026,388 A | 2/2000 | Liddy et al. |
| 6,556,972 B1 | 4/2003 | Bakis et al. |
| 6,993,473 B2 * | 1/2006 | Cartus ............................ 704/2 |
| 7,113,960 B2 | 9/2006 | Goldfuss et al. |
| 7,130,792 B2 | 10/2006 | Tokieda et al. |
| 7,533,013 B2 * | 5/2009 | Marcu ............................ 704/2 |
| 7,580,828 B2 * | 8/2009 | D'Agostini ..................... 704/2 |
| 2002/0169592 A1 | 11/2002 | Aityan |
| 2003/0004786 A1 | 1/2003 | Tokieda et al. |
| 2005/0069846 A1 | 3/2005 | Acevedo |
| 2005/0267734 A1 * | 12/2005 | Masuyama ..................... 704/2 |
| 2008/0195372 A1 * | 8/2008 | Chin et al. ..................... 704/2 |
| 2009/0076792 A1 * | 3/2009 | Lawson-Tancred ............ 704/2 |
| 2009/0326917 A1 * | 12/2009 | Hegenberger .................. 704/7 |

OTHER PUBLICATIONS

King, Margaret et al., "FEMTI: Creating and Using a Framework for MT Evaluation," Proceedings of the Machine Translation Summit IX, New Orleans, LA, Sep. 2003 (9 pages).
Ayewah, Nathaniel et al., "RSDNET: A Web-Based Collaborative Framework for Building Multilingual Semantic Networks," Studia Univ. Babes-Bolayi, Informatica, vol. XLIX, No. 1, 2004 (14 pages).
Chapman, Matthew A., "A Conceptual Framework to Rapidly Construct Multi-Lingual Textual Communication Systems in Support of Disaster Relief Operations," 2006 (11 pages).
Murata, Toshiki, "Implementation of Collaborative Translation Environment Yakushite Net," 2003 (4 pages).

* cited by examiner

*Primary Examiner*—Brian L Albertalli
(74) *Attorney, Agent, or Firm*—Perkins Coie LLP

(57) ABSTRACT

A document translation system is described. In various embodiments, the document translation system improves translations of text or speech ("documents") that are performed by computing devices ("machine translations"). Upon translating a document into a target language, the system can provide a user interface containing both the original document and a translated document. The translated document can include portions that are translated automatically by a machine translation service, and other portions that have been amended or modified by users. Upon providing the translated document, the system may receive input from a user describing portions of the translated document that should be modified. These modifications may then be stored in corpora that the document translation system can employ during future requests to translate the document. When multiple modifications are stored, the system may select one of the stored modifications during translation, such as based on the document type, reputation of the user who provided the modification, and so forth. The stored corpora can then be employed to improve future machine translations.

18 Claims, 7 Drawing Sheets

DOCUMENT TRANSLATION SYSTEM

BACKGROUND

Billions of documents exist in various natural languages, and human translators are sometimes employed to accurately translate some of these documents from one natural language into another. Because manual translation of every document into every natural language would be an inefficient use of resources and would be highly impractical, some of these documents are translated by human translators when a translation is thought to be needed. However, because there are not many expert human translators, translating documents can be expensive and time-consuming. When a non-expert is used, such as a human translator who is not familiar with a technical area in which the document was originally written, the translated document can contain translation errors.

Technology now exists to translate documents automatically. Machine translation is a computational technique that employs software to translate text or speech from one natural language ("source language") into another ("target language"). Various forms of machine translation techniques exist, including word-for-word translation techniques and corpus translation techniques. When using word-for-word translation techniques, a computing device simply employs a translation dictionary to select a translated word in a target language for each word in a document's source language. The result is oftentimes unusable and can look like gibberish to a native speaker of the target language.

To translate text, corpus machine translation techniques employ corpora of parallel or comparable text ("corpora") that humans have generally created manually that maps text in the source language to corresponding translated text in the target language. Such techniques typically can produce translations that are superior to translations produced by word-for-word translation techniques. A corpus is set of parallel or comparable text samples. As an example, a legislative document that has been manually translated from a source language into one or more target languages is a corpus of parallel text. Similarly, a novel that has been manually translated from a source language to another language is another corpus. Corpora can be tailored to particular domains or other specific attributes of documents, such as authors, genres, subject matters, and so forth. As examples, technical documents provide different corpora than literary documents; a play authored by Shakespeare provides a different corpus than a novel authored by Jean Paul Sartre; a romance novel provides a different corpus than a comic strip; and a civil engineering document may provides a different corpus than a computer engineering document. Each target language (or even each source and target language pairing) may be associated with different corpora, and these corpora may be further divided by domains, authors, subject matters, and so forth. Corpus translation techniques may use one or more corpora to statistically "learn" how to translate words or sequences of words (e.g., sentences or phrases) from a source language into a target language.

Although corpora can make machine translations more accurate, they can be difficult to obtain because they may not be readily available. As an example, it may be difficult to locate many corpora in the scientific or technical domains in some languages because many such documents may not exist for a given pair of languages. Given the lack of adequate corpora, even corpus translation techniques are not as accurate as they could be.

SUMMARY

A document translation system is described. The document translation system can improve translations of text or speech ("documents") that are performed by computing devices ("machine translations"). The document translation system can receive from a user an identification of a document and a target language into which the identified document should be translated, translate the document into the target language, and provide the translated document to the user. The document translation system can enable users to provide, among other things, (1) modifications to the translation or (2) translations to portions of the document that the document translation system could not translate. The document translation system can store these modifications and translations in association with the document that was translated. When the document translation system subsequently translates the document into the target language, it can use one or more of the stored translation modifications and translations in the subsequent translations. The document translation system may also use the stored translation modifications and translations to improve machine translators that translate documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
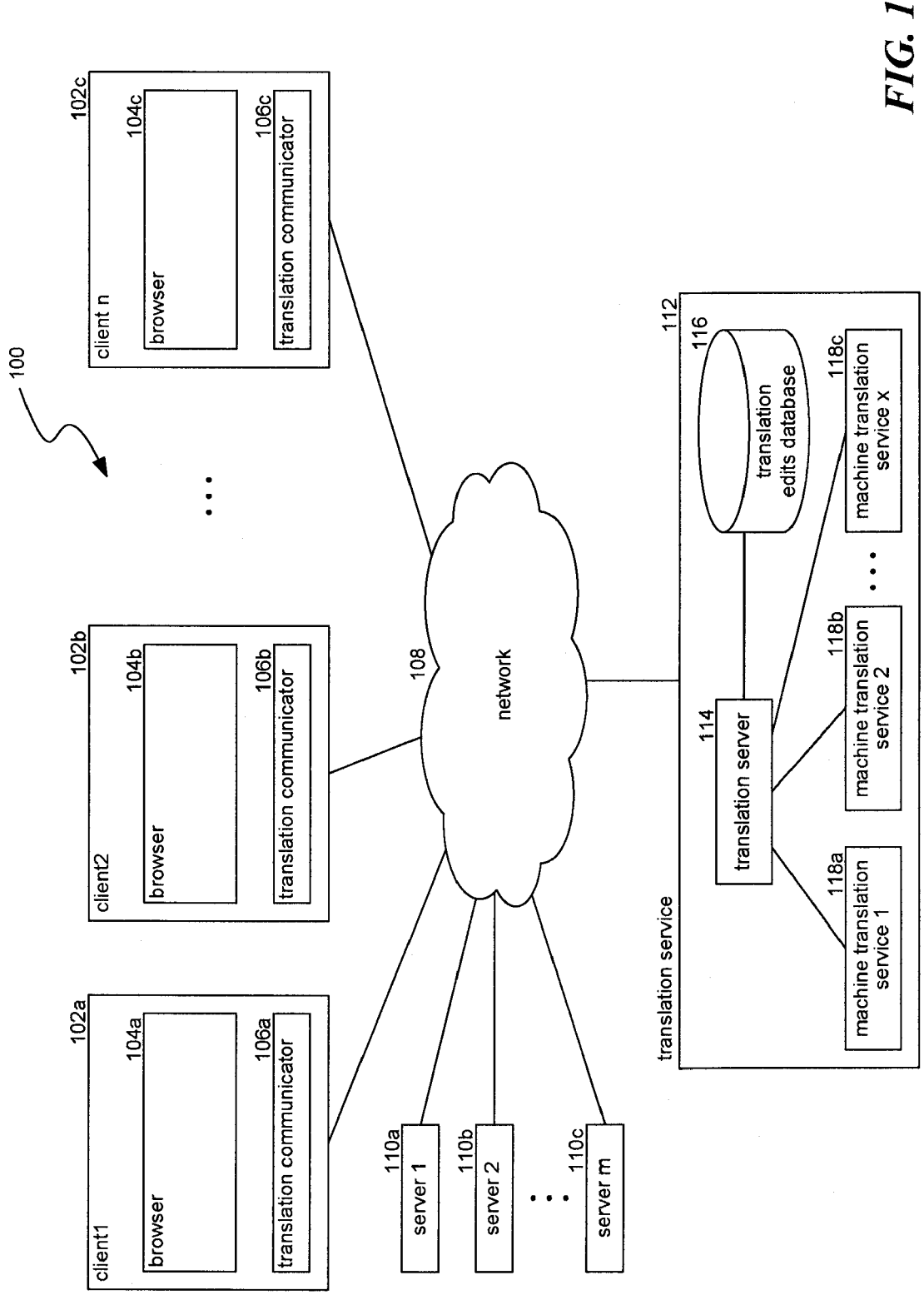
FIG. 1 is a block diagram illustrating an environment in which the document translation system may operate in some embodiments.

A document translation system is described. In various embodiments, the document translation system improves translations of text or speech ("documents") that are performed by computing devices ("machine translations"). The document translation system receives from a user an identification of a document, such as a uniform resource locator (URL), and translates the identified document from its source language into a target language. A document's source language is the natural language that the document was authored in or, alternatively, the natural language that a user specifies. The target language can be a natural language that the user indicates that the document is to be translated into. The document translation system can then translate the document into the indicated target language to create a translated document and provide the translated document to the user. The document translation system may then receive input from a user describing portions of the translated document that should be modified. For example, a user may notice that the translation of a technical phrase is a non-technical translation of that phrase. To correct the translation, the user can supply the technical translation as a translation modification. The document translation system can store the translation modifications it receives into a database of translation edits and associate the stored translation modifications with the original document that was translated. When the document translation system subsequently translates the document into the target language, it can use one or more of the stored translation modifications in the subsequent translations. For example, in a subsequent translation, the document translation system may use the user-supplied translation modification of the technical phrase rather than the non-technical translation. Thus, the translated document can include portions that are translated automatically by a machine translation service, and other portions that have been modified by users. The document translation system may also use the stored translation modifications to improve machine translation components that translate documents.

The document translation system can provide a user interface for enabling user interactions. One such user interaction enables the comparison between original and translated text. The user interface can display the original document and the translated document in two regions of the screen, such as in two panels or frames of an Internet browser. If the user selects text (e.g., a word or sequence of words) in one of the regions, the document translation system highlights the corresponding text in the other region. As an example, if the user selects text in the original document, the document translation system highlights corresponding translated text in the translated document.

Another user interaction the user interface enables is recording translation modifications. The user can indicate to modify text in the translated document (e.g., a machine translation error, an incorrect translation modification supplied by another user, or text that the document translation system could not translate), such as by selecting text and then supplying a modified translation for the selected text. The document translation system stores the modified translation that the user supplies and can update the translated copy that the user interface displays. The document translation system can store the edited text along with other information, such as the original document's identification, original text, previously translated text, author who made the translation modification, type of document, and so forth. The document translation system may also store various attributes relating to the original document, such as whether it is a technical document, literary document, document type, source language, and so forth.

Subsequent users who request a translation of the document may see the user-supplied translations. As an example, the document translation system can translate most of the document, but can provide the user-supplied translation modifications when such translations are available, thereby improving the results of machine translation. When the document translation system translates a document for which it has received multiple translation modifications, the document translation system may select one or more of the stored modifications during translation, such as based on the document type, reputation of the user who provided the modification, and so forth. As an example, a user who provides translation modifications that others do not modify may have a better reputation than another user who maliciously provides incorrect translation modifications. When the document translation system receives a request to translate a document for which translation modifications are available from both users, it may select the translation modifications received from the user with the better reputation and ignore the other translation modifications received from the malicious user.

The document translation system can select one or more machine translation services and request the selected machine translation service to translate the document. The various machine translation services may be adapted for various document attributes, such as domain, author, source and/or target language, and so forth. When the user identifies a document for translation, the user may also specify a document attribute, e.g., domain or author, that the document translation system can employ to select a machine translation service. In various embodiments, the document translation system may employ the specified document attribute or may determine the document attribute (e.g., by analyzing the contents of the document) to select a document translation service to translate the document. As an example, upon detecting that a document is a technical document, the document translation system may select a document translation service that is adapted for translation of technical documents.

An example implementing the document translation system will now be described in detail. Various modifications to the described implementation are possible.

In some embodiments the document translation system adds code for enabling the user interface. When a translation server component of the document translation system receives an identification of a document, the translation server component can retrieve the identified document and embed code in the document to enable users to edit portions of the translated document. The embedded code can be in a programming language that client software, such as an Internet browser, can execute. As an example, the embedded code can be in JavaScript. The embedded code provides a user interface that enables a user to supply a modification to translated text. To invoke the user interface, the user may select text (e.g., a word or a sequence of words) and then invoke an edit command, such as from a context menu that can be selected by momentarily depressing a right mouse button when a mouse pointer is proximate to the text. To supply a modification in the target language, the user may employ a "soft keyboard," physical keyboard, or other input device that is capable of providing text in the target language. A soft keyboard is a keyboard that is supplied by a software component, such as an operating system component. The user can supply a translation modification to the embedded code (e.g., in an edit control) by using the input device. The embedded code provides the modified text that it receives to the translation server component for storage in a translation edits database. The translation server component may store additional information corresponding to the stored modification, such as an identification of the user who supplied the modification, an identification of the document (e.g., URL), an identification of the source and target languages, the original text, the previously translated text that is being modified, and other document attributes. In some embodiments, the translation server component may store a "delta" or difference between the original text of the document (or translation previously provided to the user by the document translation system) and the translation modification the user supplies. In various embodiments, the document translation system can store multiple user-supplied translation modifications for a word or sequence of words.

The document translation system can create two document object models ("DOM") representing the original and translated documents. A first DOM represents the original document and a second DOM represents a translated version of the document. Nodes of one DOM may have links to corresponding nodes of the other DOM and each node may be associated with an element of the document, such as a word, paragraph, table cell, and so forth. In various embodiments, the nodes can represent an encapsulation of text, such as an element of a markup language (e.g., hypertext markup language ("HTML") or extensible markup language ("XML")). As examples, text within <p>, <div>, <li>, <td> or other HTML elements can be associated with a node. When the user selects a word or a sequence of words represented by a node of a DOM, the document translation system can select the corresponding word or sequence of words by identifying a corresponding node of the other DOM by employing the links. The user can select a word or sequence of words by clicking a mouse button while a mouse pointer is proximate to the word or sequence of words, merely by momentarily placing the mouse pointer proximate to the word or sequence of words (e.g., "hovering"), or via some other user action. The user can thus easily identify how text from the source language has been translated by the document translation system into text in the target language.

In various embodiments, the document translation system has a client component that registers a translation service so that the translations occur asynchronously. In these embodiments, the original document is initially displayed twice and the second copy is translated asynchronously. Thus, the user may initially see two copies of the document in the source language and the second copy eventually displays the translated version of the document in the target language for those portions that could be translated by the document translation system. Portions that could not be translated may remain in the source language. In some embodiments, the document translation system can first check the database of user-supplied translation modifications before employing a machine translation service. In other embodiments, the document translation system can asynchronously employ a machine translation service to translate text associated with a node of a DOM and concurrently search for and select user-supplied translation modifications.

When translating a document, the translation server component may employ various techniques to select one from among multiple user-supplied translation modifications, to determine that no user-supplied translation modifications should be employed, or to determine if all or a portion of the text should be replaced. The translation server component may make these selections or determinations based on attributes relating to the user-supplied modifications, such as the URL of the document, trustworthiness of the user that supplied the modifications, document contents (e.g., type, genre, etc.), source and/or target language, and so forth. As an example, the translation server component may employ a modification supplied by a technical user to replace a portion of a technical document but may not employ the modification to replace a portion of a literary document. As another example, the translation server component may replace a proper name in the original document with a user-supplied modification with much higher probability than a verb because it is less likely that a proper noun can be misconstrued by a machine translation service than a verb. As another example, the translation server component may not employ a translation modification supplied by a user with a low reputation (e.g., a user who has been identified as supplying "spam" or incorrect translation modifications). As another example, a user who supplies many translation modifications that are not later corrected by other users may have a superior reputation as compared to another user who supplies few translation modifications or whose translation modifications are often corrected, and translation modifications supplied by the user with the superior reputation may be given preference when selecting user-supplied translation modifications.

In some embodiments, the document translation system can employ asynchronous programming constructs or techniques, such as asynchronous JavaScript and XML ("AJAX"), "Web 2.0," or other asynchronous technology. A component, such as a client component associated with an Internet browser ("translation communicator component"), can asynchronously make a translation request to a translation server component. The request can include one or more of the following: the URL of the document to translate, the text to be translated, the source language, the target language, the user identifier, and so forth. The translation server component can then translate the text using machine translation services and retrieve user-supplied translation modifications. The translation server component can then provide the translated text to the translation communicator component, such as by invoking an AJAX callback function provided by the translation communicator component. The translation communicator component may then cause the browser to update the text in the translated portion of the displayed document, such as by updating the corresponding portion of the DOM.

In some embodiments, the corpora of user-supplied translation modifications can be employed by machine translation learning techniques to improve the quality of machine translations. Over time, machine translation services may improve to the point that fewer user-supplied translation modifications will be required. As an example, the stored translation modifications can be used to train components of the document translation system that perform machine translations. Thus, the stored translation modifications can be employed as corpora so that the document translation system can improve its translation capabilities over time. The corpora of user-supplied translation modifications can be employed to "bootstrap" the machine translation learning. As an example, suppose the document translation system initially provides, for sentence Z, a translation A and receives a user-supplied translation modification B. The document translation system can employ A and B for improving the machine translation component. The document translation system may next translate sentence Z to translation C and may receive a user-supplied translation modification D. The document translation system can employ C and D for improving the machine translation component. Thus, the machine translation can improve iteratively.

In some embodiments, the document translation system may require users to identify themselves, e.g., by using authentication credentials, before they supply translation modifications so that the user-supplied translation modifications can be associated with users and tracked.

The document translation system will now be described with reference to the Figures. FIG. 1 is a block diagram illustrating an environment in which the document translation system may operate in some embodiments. The environment 100 can include one or more client computing devices, such as client 1 102*a*, client 2 102*b*, and client n 102*c*. Each client computing device can include a browser component, such as browser components 104*a*-*c*, and a translation communicator component, such as translation communicator components 106*a*-*c*. The client computing devices may also be connected via a network 108 to various servers, such as servers 110*a*-*c*, and to one or more document translation services 112. Servers 110*a*-*c* may provide various services, such as serving documents identified by a URL.

The document translation service 112 can be hosted by server computing devices (e.g., servers 110*a*-*c*) and can include a translation server component 114, a database of translation edits 116, and one or more machine translation services, such as machine translation services 118*a*-*c*. The translation server component 114 can receive and respond to translation requests that it receives from translation communicator components 106*a*-*c*. It may employ the machine translation services 118*a*-*c* to translate portions of documents and may retrieve user-supplied translation modifications from the translation edits database 116.

The computing devices on which the document translation system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the document translation system. In addition, the data structures and message structures may be stored or transmitted via a data transmission medium, such as a signal on a communications link. Various communications links may be employed, such as the Internet, a local area network, a wide area network, or a point-to-point dial-up connection.

The document translation system may use various computing systems or devices, including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The document translation system may also provide its services to various computing systems, such as personal computers, cell phones, personal digital assistants, consumer electronics, home automation devices, and so on.

The document translation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
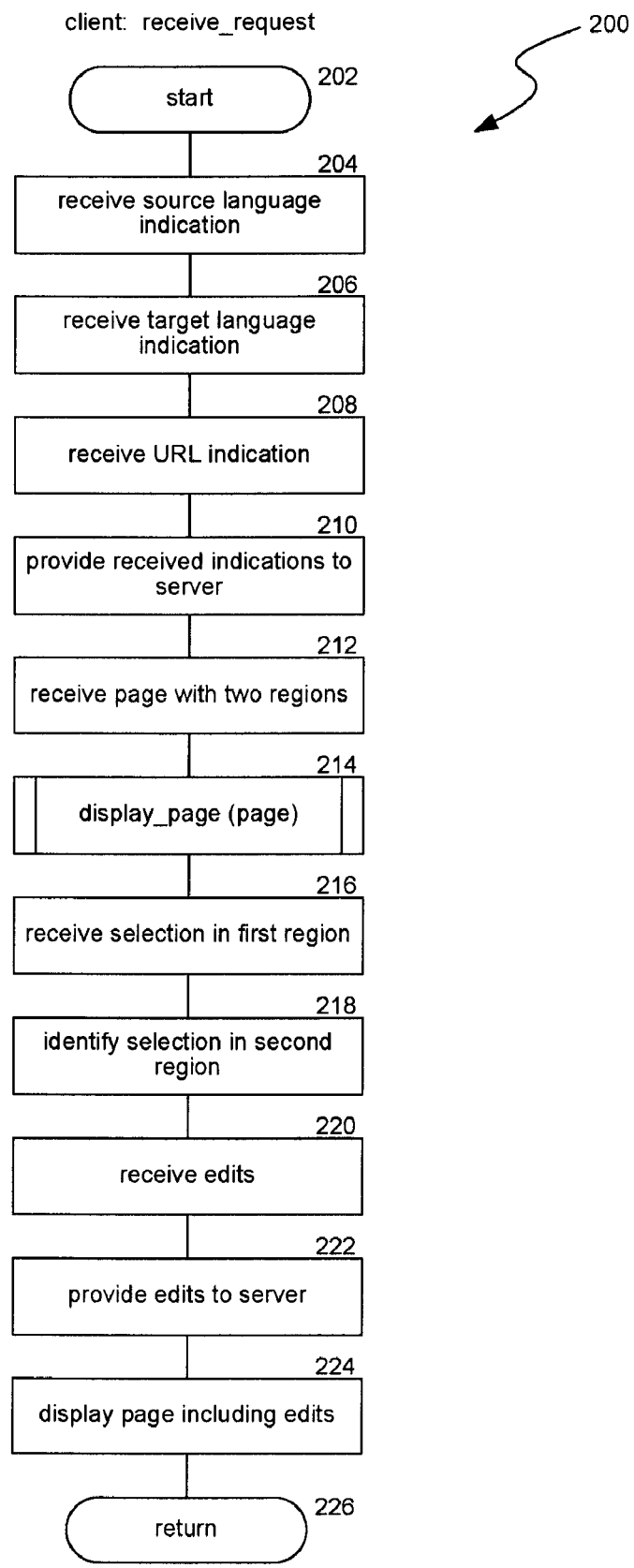
FIG. 2 is a flow diagram illustrating a receive_request routine invoked by the document translation system in some embodiments.

FIG. 2 is a flow diagram illustrating a receive_request routine invoked by the document translation system in some embodiments. The document translation system can invoke the receive_request routine 200 when a user identifies a document for translation. The routine begins at block 202. At block 204, the routine receives an indication of a source language. In some embodiments, the routine may determine the source language based on the identified document. In other embodiments, the user may specify a source language. At block 206, the routine receives an indication of a target language into which the user desires the document to be translated. At block 208, the routine receives an identification of a document, such as a URL.

At block 210, the routine provides the indications of the target language and document to a translation server component. In some embodiments, the routine also provides an indication of the source language to the translation server component. As an example, the routine may send a request to the translation server component, such as by employing a hypertext transfer protocol. The translation server component may then translate the document from the source language to the identified target language.

At block 212, the routine receives the original document and the translated document, such as in two regions or portions of a Web page. In some embodiments, the translation communicator component may receive two DOMs and construct a page to display the text associated with both DOMs. One DOM may contain the original text in the source language and the other DOM may contain the translated text in the target language. The two regions may contain links to each other so that when a user selects text in one region, corresponding text in the other region can also be selected. Moreover, the document may contain logic (e.g., script) that enables the user to edit the translated portions of the document to supply translation modifications. The user may first need to log in before supplying translation modifications.

At block 214, the routine invokes a display_page subroutine and provides an indication of the received page. The display_page subroutine can display a Web page (or other document definition). The display_page routine is described in further detail below in relation to FIG. 5.

At block 216, the routine receives a selection of a word or a sequence of words in one region of the displayed page. At block 218, the routine identifies the corresponding word or sequence of words in the other region of the displayed page. Logic (e.g., script code) that the translation server component adds to the documents it provides may enable the cross-selection of text.

At block 220, the routine receives edits from a user, such as a user-supplied translation modification. In some embodiments, the routine may receive the edits in a user interface that the translation server component adds to the documents it provides that are displayed when the user indicates that the user desires to supply a translation modification, such as by invoking an edit command.

At block 222, the routine provides the edits it received from the user to the translation server component. The routine may provide additional information to the translation server component, such as the user's identity, source language, target language, document identification, document type, and so forth. The translation server component may then store this information, such as in the translation edits database.

At block 224, the routine refreshes the displayed page to include the edits the user made. In various embodiments, edits a user makes may be displayed when the user again identifies the same document even when these edits may not be displayed to other users, such as because they have been determined to be less reliable than other edits for the machine translation itself. The routine returns at block 226.

Those skilled in the art will appreciate that the logic illustrated in FIG. 2 and described above, and in each of the flow diagrams discussed below, may be altered in various ways. For example, the order of the logic may be rearranged, substeps may be performed in parallel, illustrated logic may be omitted, other logic may be included, etc. Some routines, while described as being performed at a server computing device may also (or instead) be performed at a client computing device or vice versa.

Figure 3:
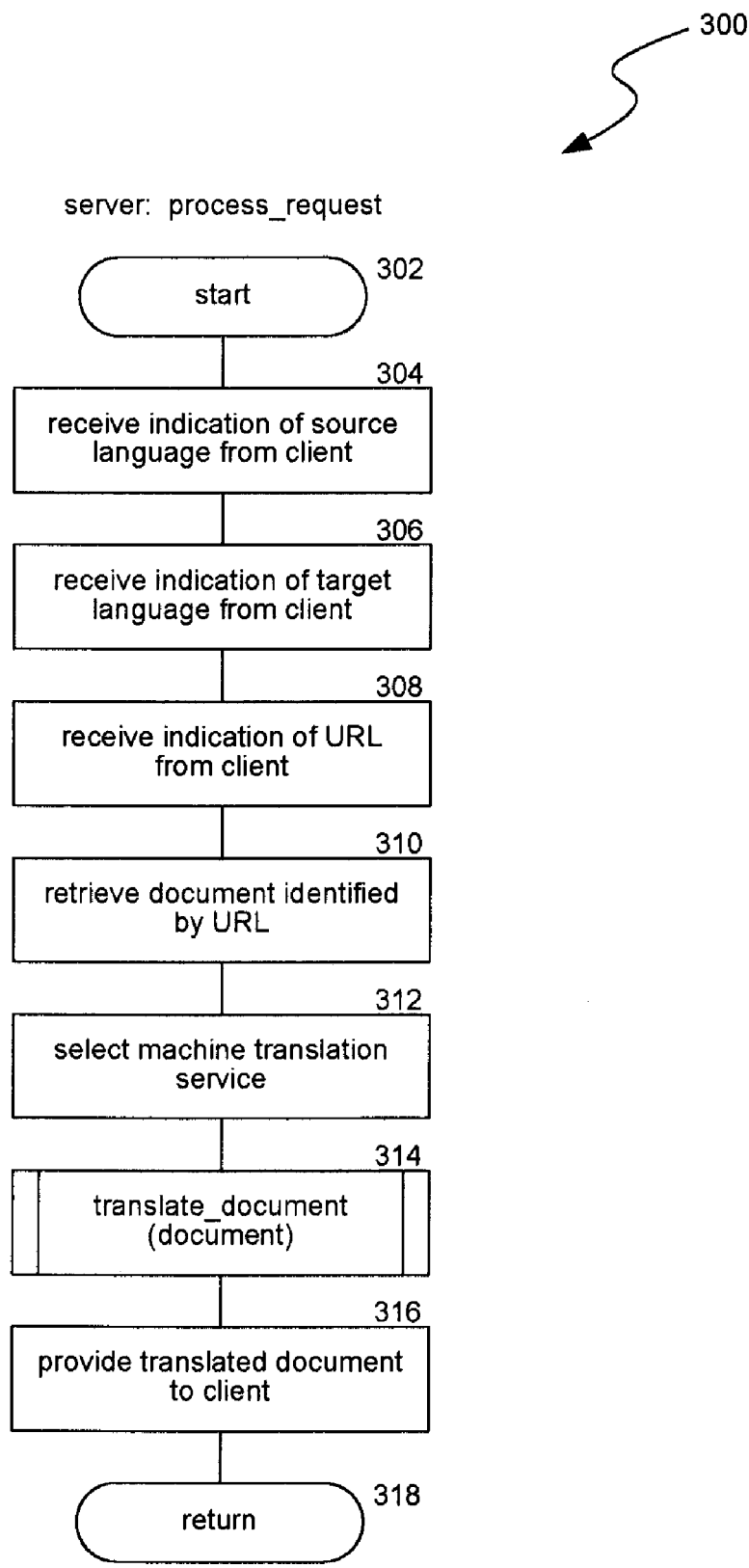
FIG. 3 is a flow diagram illustrating a process_request routine invoked by the document translation system in some embodiments.

FIG. 3 is a flow diagram illustrating a process_request routine invoked by the document translation system in some embodiments. The process_request routine 300 can be invoked by the translation server component to process translation requests that it receives from translation communicator components. The routine begins at block 302.

At block 304, the routine receives an indication of a source language from a client, such as a translation communicator component. In some embodiments, the routine may identify the source language, such as by analyzing the identified document. At block 306, the routine receives an indication of a target language. At block 308, the routine receives an identification of the document that is to be translated, such as its URL. A user can provide these and other specifications of parameters for document translations. At block 310, the routine retrieves the identified document.

At block 312, the routine can select from one of multiple machine translation services. As an example, the routine may select a machine translation service based on various document attributes, the source and/or destination language, and so forth.

At block 314, the routine invokes a translate_document subroutine and provides the identification of the document to be translated to that subroutine. The translate_document subroutine can be invoked to employ the selected machine translation service and stored translation modifications to translate portions of the identified document. The translate_document subroutine is described in further detail immediately below in relation to FIG. 4.

At block 316, the routine provides the translated document to the client that made the translation request. At block 318, the routine returns.

Figure 4:
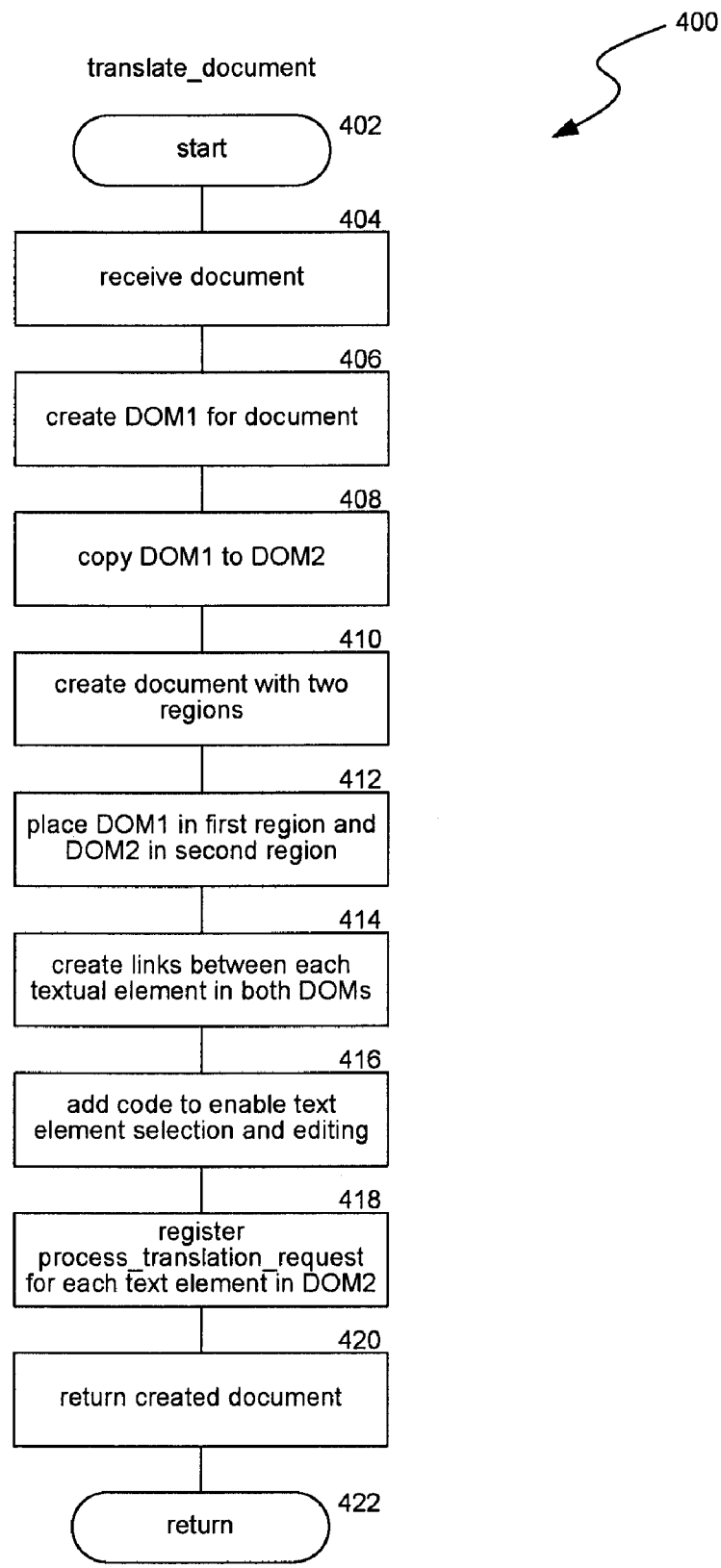
FIG. 4 is a flow diagram illustrating a translate_document routine invoked by the document translation system in some embodiments.

FIG. 4 is a flow diagram illustrating a translate_document routine invoked by the document translation system in some embodiments. The document translation system can invoke the translate_document routine 400 to translate documents, enable cross-linking between displayed original and translated documents, and enable editing. The routine begins at block 402.

At block 404, the routine receives an identification of the document. At block 406, the routine creates a first DOM for the original document. At block 408, the routine creates a second DOM and copies contents of the first DOM into the second DOM. At block 410, the routine creates a document (e.g., an HTML or Web page) with two regions. At block 412, the routine replaces the first DOM in the first region and the second DOM in the second region. At block 414, the routine creates links between each textual element (e.g., DOM node) in both DOMs. At block 416, the routine adds code to the created document so that selecting a textual element in one region causes the corresponding textual elements to be selected in the other region. The routine also adds code to enable editing.

At block 418, the routine registers an asynchronous invocation of a process_translation_request routine for each textual element in the second DOM (e.g., the translated instance). The process_translation_request processes translation requests asynchronously and is described in further detail below in relation to FIG. 7.

At block 420, the routine returns the created document. At block 422, the routine returns.

Figure 5:
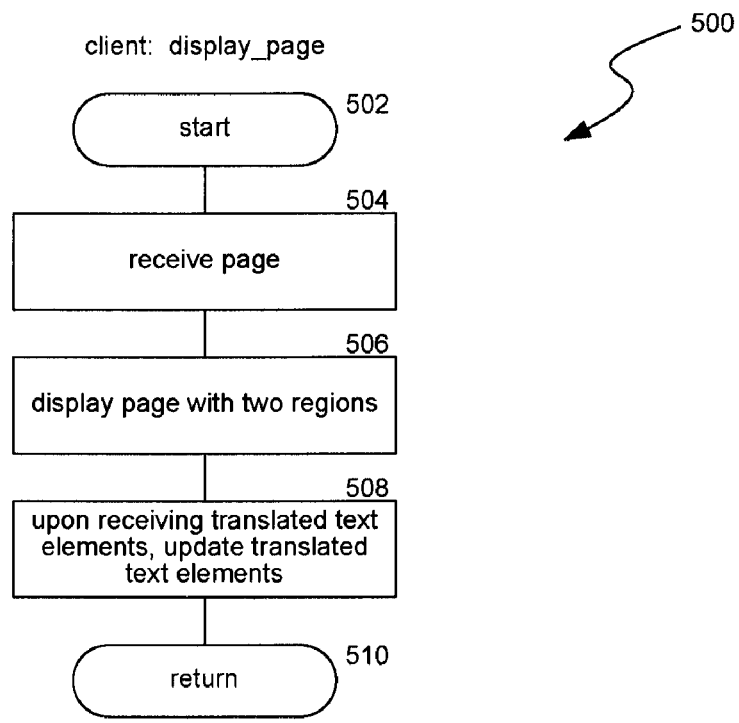
FIG. 5 is a flow diagram illustrating a display_page routine invoked by the document translation system in some embodiments.

FIG. 5 is a flow diagram illustrating a display_page routine invoked by the document translation system in some embodiments. The document translation system can invoke the display_page routine 500 to display a page, such as a created document. The routine begins at block 502. At block 504, the routine receives the created document or page. At block 506, the routine displays the page in two regions (e.g., frames). The translation communicator component may then receive results from the asynchronous calls issued to the process_translation_request routine. Upon receiving translated text elements, the routine updates the second region with the translated text elements at block 508. At block 510, the routine returns.

Figure 6:
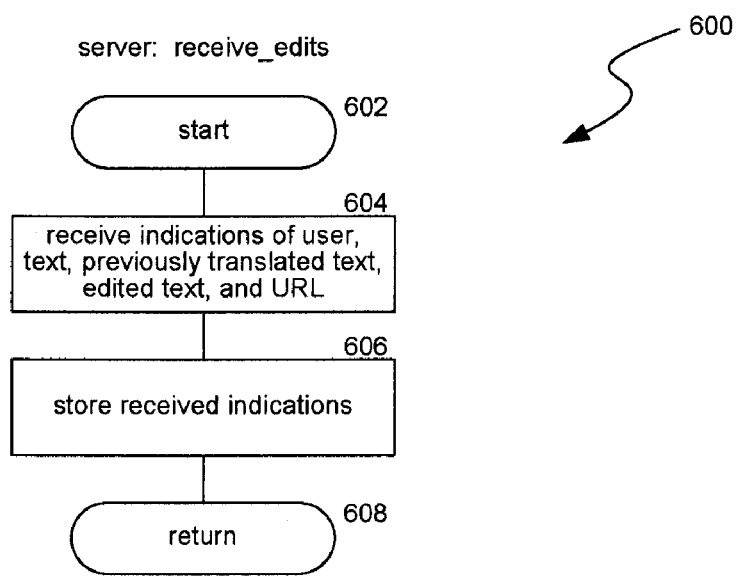
FIG. 6 is a flow diagram illustrating a receive_edits routine invoked by the document translation system in some embodiments.

FIG. 6 is a flow diagram illustrating a receive_edits routine invoked by the document translation system in some embodiments. The document translation system may invoke the receive_edits routine 600 when a user supplies translation modifications. The routine begins at block 602. At block 604, the routine receives indications of the user supplying the modifications, the original text, previously translated text, text indicating the user-supplied translation modification, and identification of the original document (e.g., its URL). At block 606, the routine stores the information it received at block 604, such as in a translation edits database. At block 608, the routine returns.

Figure 7:
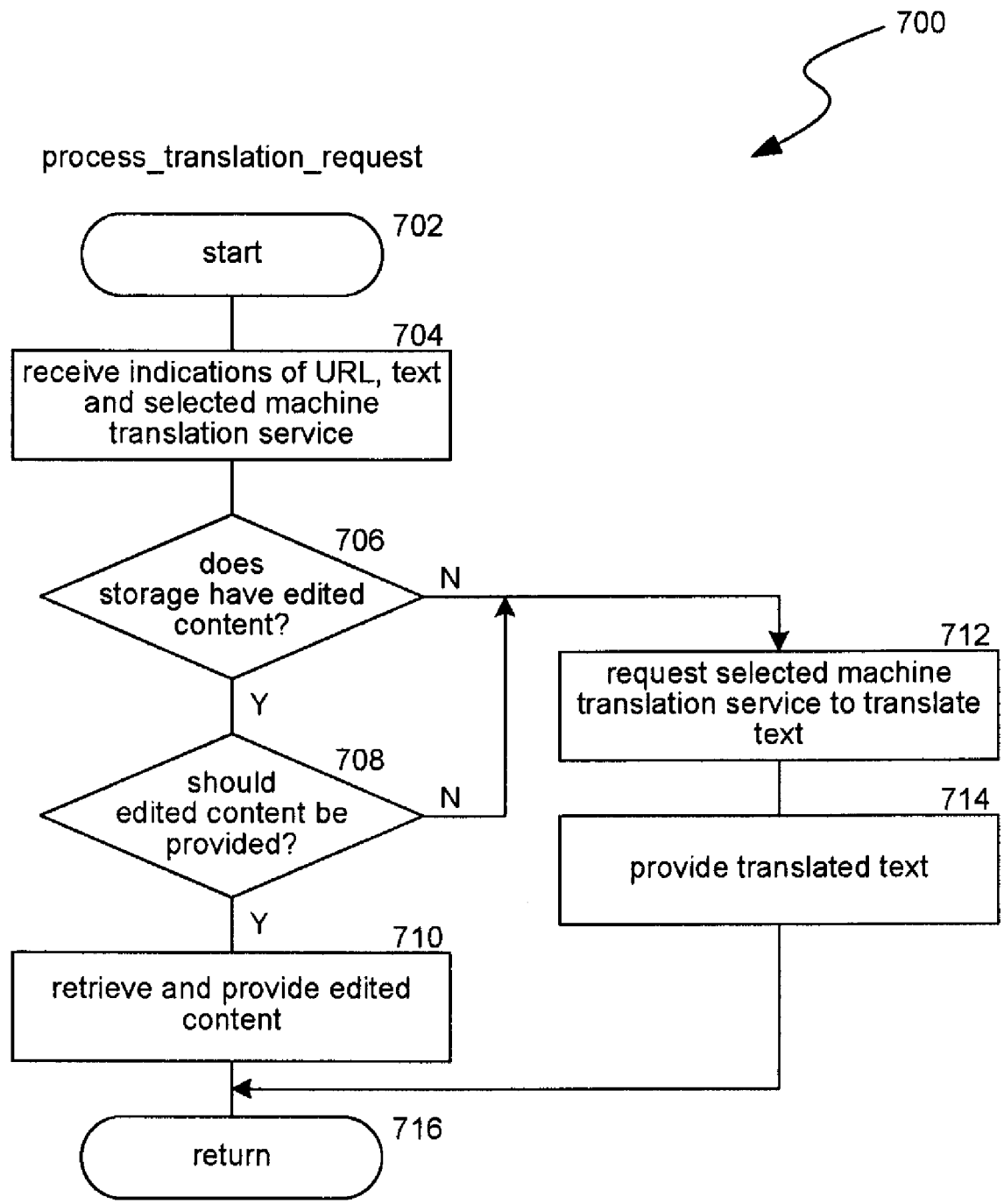
FIG. 7 is a flow diagram illustrating a process_translation_request routine invoked by the document translation system in some embodiments.

FIG. 7 is a flow diagram illustrating a process_translation_request routine invoked by the document translation system in some embodiments. The document translation system may invoke the process_translation_request routine 700 to process translation requests asynchronously. As an example, a translation communicator component may issue the request and the routine may be invoked by a translation server component. The routine begins at block 702.

At block 704, the routine receives indications of an identification of a document, text to be translated, and a selected machine translation service. At decision block 706, the routine determines whether a storage (e.g., translation edits database) stores user-supplied translation modifications. If a storage stores user-supplied translation modifications, the routine continues at decision block 708. Otherwise, the routine continues at block 712.

At decision block 708, the routine determines whether the stored user-supplied translation modifications should be provided as part of the translated document. If that is the case, the routine continues at block 710. Otherwise, the routine continues at block 712. The routine may make this determination based on various factors, such as the document's type or other document attributes, the source and/or target languages, reputations of the users who supplied the translation modifications, and so forth.

At block 710, the routine retrieves and provides the user-supplied translation modifications. The routine then continues at block 716, where it returns.

At block 712, the routine requests the selected machine translation service to translate the text. At block 714, the routine provides the translated text. The routine then continues at block 716, where it returns.

Figure 8A:
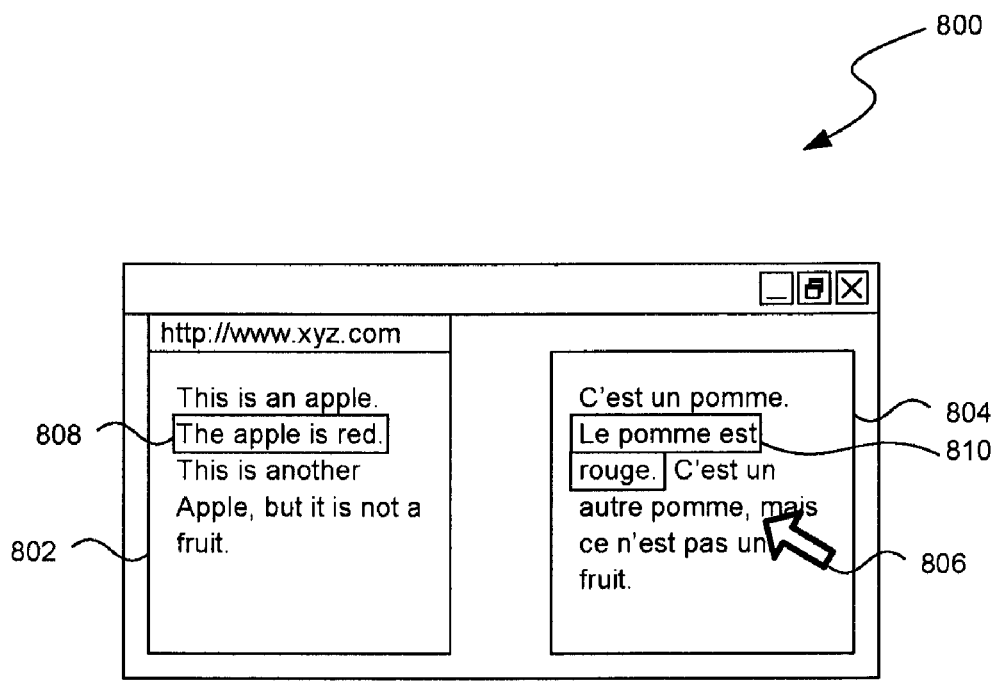
FIGS. 8A-8B are user interface diagrams illustrating user interfaces provided by the document translation system in various embodiments.
Figure 8B:
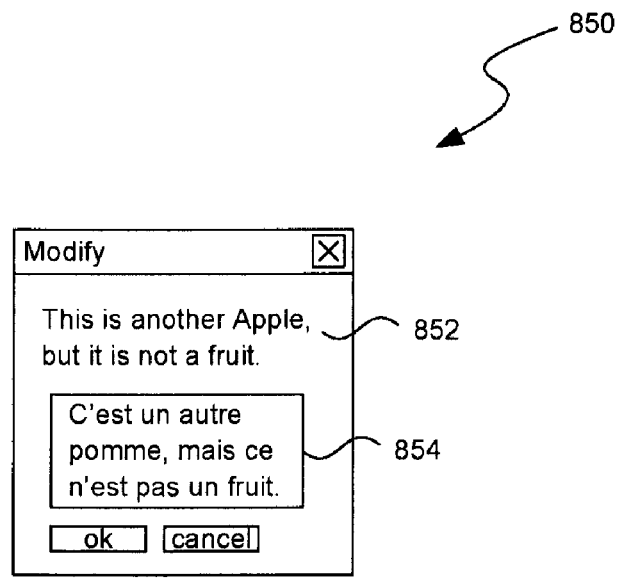

FIGS. 8A-8B are user interface diagrams illustrating user interfaces provided by the document translation system in various embodiments. FIG. 8A illustrates a user interface 800 having an original document in a source language (English) associated with a URL (www.xyz.com) in a region 802 and a translated document in a target language (French) in another region 804. The user has selected text that the document translation system has highlighted both in region 802 as highlighted region 808 and in region 804 as highlighted region 810. As an example, the user may have positioned a mouse pointer 806 over the highlighted text in either region and momentarily depressed a mouse button. The user can also provide a translation modification, such as by positioning the mouse pointer over translated text and selecting an Edit option in a context menu.

The document translation system may then provide a user interface similar to user interface 850 of FIG. 8B. The user interface 850 can provide the original text 852 and an edit region 854 that may initially include the translated text. The user can then modify the translation by editing the text in the edit region and provide the translation modification to the document translation system for subsequent use. The document translation system may then modify the translated text appearing in region 804 to reflect the user-provided translation modification. The document translation system may also employ the translation modification during subsequent translations or to improve machine translation service components.

In some embodiments, the document translation system can visually distinguish text that was translated using a machine translation service from text that was supplied by a user as a translation modification, such as by using icons, colors, font styles, shading, "tool tips," and so forth.

In some embodiments, the document translation system may determine whether a user-supplied translation modification applies only to a document relating to which the modification was supplied or additionally to other documents. This determination can be made based on the user's identity, the document, the source and/or target language, or document attributes.

In some embodiments, a "spammer" (e.g., a person that provides false translation modifications purposefully or inadvertently) can be detected based on a comparison of supplied words to a list of words that should not be translated, determining that a "distance" between the user-supplied translation modification and the machine translation (or prior translation) of the word or word sequence is "too far" (e.g., by comparing the number of words), and so forth. In some embodiments, a user can identify a spammer by providing the spammer's user identification.

In various embodiments, the document translation system can function with HTML, XML, and other document types, such as MICROSOFT WORD documents, text documents, and so forth.

In some embodiments, user-supplied translation modifications can be counted and scored, such as to provide users with rewards or recognition (e.g., in a "hall of frame").

In some embodiments, text that the document translation system translates can be stored in a document, such as after it is typed by a person or converted to text from speech using a speech-to-text system.

In some embodiments, the document translation system can store translations of documents so that it does not again need to translate documents it has already translated. In such embodiments, the document translation system can retrieve the stored translation and apply user-supplied translation modifications to create a translated document, and provide the translated document to the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computer system having a processor and memory to improve document translations, comprising:
   receiving a request for a translated document in a preferred natural language;
   retrieving an identified document, the identified document storing text in a first natural language;
   translating using the processor the retrieved document to create the translated document containing text translated into the preferred natural language wherein the preferred natural language is a natural language that is not the first natural language;
   providing the translated document;
   receiving a modification to a word in the translated document;
   storing the received modification to the translated word to improve a subsequent request for the translated document;
   receiving a subsequent modification to the translated word in the translated document; and
   storing in the storage the received subsequent modification to the translated word;
   upon receiving the subsequent request for the translated document,
      retrieving the identified document;
      translating the retrieved document into the preferred natural language;
      selecting either the modification or the subsequent modification based at least on an identification of users who made the modifications and a relative trustworthiness of the users, wherein the trustworthiness of a user is based on how many times other users modify a modification made b the user;
      retrieving the selected modification;
      modifying the translated document based on the retrieved modification; and
      providing the modified translated document.

2. The method of claim 1 further comprising:
   upon receiving the subsequent request for the translated document, retrieving the identified document;
      translating the retrieved document into the preferred natural language or retrieving a stored version of the translated document;
      retrieving the received modification to the translated word;
      modifying the translated document based on the retrieved modification; and
      providing the modified translated document.

3. The method of claim 2 further comprising identifying the modification as a user-provided modification.

4. The method of claim 1 further comprising providing the identified document in addition to the translated document wherein a sequence of words in the provided identified document is correlated with a sequence of words in the provided translated document.

5. The method of claim 4 wherein the correlation is a link that causes the sequence of words in the provided identified document and the provided translated document both to be highlighted when the sequence of words in the provided document is selected.

6. The method of claim 4 wherein the correlation is a link that causes the sequence of words in the provided identified document and the provided translated document both to be highlighted when the sequence of words in the provided translated document is selected.

7. The method of claim 1 further comprising:
receiving a subsequent modification to the translated word in the translated document; and
storing in the storage the received subsequent modification to the translated word;
upon receiving the subsequent request for the translated document, retrieving the identified document;
translating the retrieved document into the preferred natural language;
selecting either the modification or the subsequent modification;
retrieving the selected modification;
modifying the translated document based on the retrieved modification; and
providing the modified translated document.

8. The method of claim 1 wherein the trustworthiness of users changes over time.

9. The method of claim 1 further comprising providing a stored modification to a machine translation learning system to improve future machine translations.

10. A computer-readable medium storing computer-executable instructions that, when executed, cause a computer system to perform a method for improving document translations, the method comprising:
providing to a server an identification of a document and a preferred natural language; and
receiving from the server the document in the identified preferred natural language wherein the document in the identified preferred natural language contains a user-supplied modification to a translated word wherein the user-supplied modification was supplied to correct a prior translation, the user-supplied modification having been selected from multiple user-supplied modifications based at least on comparing a number of times the user-supplied modifications have been modified by users other than a user who initially provided the modification.

11. The computer-readable medium of claim 10 wherein the method further comprises:
receiving from the server the document in an original natural language;
displaying in a first region the document in the original natural language;
displaying in a second region the document in the identified preferred natural language;
receiving a selection of a sequence of words in one of the regions; and
identifying a corresponding set of words in the other of the regions.

12. The computer-readable medium of claim 11 wherein the method further comprises identifying in the second region the modified translated word.

13. The computer-readable medium of claim 12 wherein the method further comprises identifying in the first region a word corresponding to the modified translated word.

14. The computer-readable medium of claim 10 wherein the method further comprises:
receiving from a user a modification to a word in the document received in the identified preferred natural language; and
providing to the server the modification received from the user so that the modification can be provided by the server when it receives a subsequent request to translate the document.

15. The computer-readable medium of claim 10 wherein the method further comprises:
receiving from a user a correction to the modification; and
providing to the server the correction received from the user so that the correction can be provided by the server when it receives a subsequent request to translate the document.

16. A system for improving document translations, comprising:
a component configured to receive an identification of an original document that contains text in a first natural language, retrieve the original document, translate the text from the first natural language into a second natural language using a machine translation service to create a translated document, add editing code to the created translated document to enable a user to supply a translation modification, and provide the translated document; and
a component configured to (a) select a user-supplied modification from multiple user-supplied modifications based at least on comparing a number of times the user-supplied modifications have been modified by users other than a user who initially provided the modification; and (b) modify the translated document based on the selected user-supplied modification.

17. The system of claim 16 wherein the translation server component additionally supplies editing code and the translation communicator component employs the editing code to receive a translation modification from a user and supplies the translation modification to the translation server component.

18. The system of claim 17 wherein the translation server component stores in a translation edits database the translation modification it receives from the translation communicator component and provides the translation modification when it subsequently receives a request to translate the original document into the second natural language.

* * * * *